United States Patent [19]

Schneider et al.

[11] Patent Number: 4,736,003

[45] Date of Patent: Apr. 5, 1988

[54] ENHANCED LIVINGNESS OF POLYMERIZATION USING SILYLATED OXYANIONS

[75] Inventors: Luke V. Schneider, Norristown, Pa.; Ira B. Dicker, Wilmington, Del.

[73] Assignee: E. I. Du Pont de Nemours and Company, Wilmington, Del.

[21] Appl. No.: 15,727

[22] Filed: Feb. 27, 1987

Related U.S. Application Data

[63] Continuation-in-part of Ser. No. 849,251, Apr. 7, 1986, abandoned.

[51] Int. Cl.$^4$ ............................................. C08F 5/58
[52] U.S. Cl. ................................... 526/190; 526/192; 526/194

[58] Field of Search ................ 526/184, 190, 192, 194

[56] References Cited

U.S. PATENT DOCUMENTS 4,588,795  5/1986  Dicker ................................. 526/194
4,622,372 11/1986  Dicker ................................. 526/190

*Primary Examiner*—Paul R. Michl
*Attorney, Agent, or Firm*—Richard H. Burgess

[57] ABSTRACT

Silylated oxyanion catalysts, such as trimethyl silyl 3-chlorobenzoate, provide increased livingness of group transfer polymerization, thereby permitting higher molecular weights and polymerization efficiencies.

16 Claims, No Drawings

4,736,003

ENHANCED LIVINGNESS OF POLYMERIZATION USING SILYLATED OXYANIONS

CROSS REFERENCE TO RELATED APPLICATION

This is a continuation-in-part of Ser. No. 849,251 filed Apr. 7, 1986, now abandoned.

BACKGROUND

This invention relates to a process for polymerizing polar a-olefinic monomers to "living" polymers and to the "living" polymers produced by such a process.

The technology known as group transfer polymerization is described in U.S. Pat. Nos. 4,417,034—Webster and 4,414,372—Farnham and Sogah, both granted in 1983, and in 4,508,880—Webster, granted Apr. 2, 1985. The former claims "living" polymers and their preparation from acrylic-type or maleimide monomers using defined organosilicon, -tin, or -germanium initiators and a catalyst which is a source of fluoride, cyanide or azide ions or a suitable Lewis acid. The latter is similar but uses as a co-catalyst a source of bifluoride ions. Both disclose various suitable solvents for the catalyst including acetonitrile used in amounts including 19 moles per mole of catalyst and more; acetonitrile is also used in even larger quantities as a general solvent for the polymerization.

By "living" polymer is meant a polymer of the invention which contains at least one active terminal group and is capable of polymerizing further in the presence of monomer(s) and co-catalyst. The words "living" and "livingness" are used herein in quotation marks to distinguish from any biological connotations.

In attempts to use group transfer polymerization to better advantage, it would be desirable to find ways to increase or enhance the duration of the "livingness" of the polymerization. This would involve somehow decreasing the proportion of termination to further polymerization events. This could lead to higher molecular weight, lower polydispersity, and better control and predictability of molecular weight.

Related applications include Ser. Nos. 660,588 abandoned and 660,589 U.S. Pat. No. 4,581,428 filed Oct. 18, 1984; 673,926 U.S. Pat. No. 4,681,918 filed Nov. 21, 1984; and 676,099 above filed Nov. 29, 1984. Also, U.S. Pat. No. 4,588,795—Dicker et al., granted May 13, 1986, discloses and claims the use of certain types of oxyanion catalysts in group transfer polymerization, and U.S. Pat. No. 4,622,372—Dicker et al., granted Nov. 11, 1986, discloses and claims livingness enhancement of such oxyanion catalyst using acetonitrile or silylated acetonitrile, but that may sometimes involve tying up some catalyst and thereby slowing down polymerization compared to the rate if all the catalyst were available.

The disclosures of the above-mentioned patents and applications are hereby incorporated by reference.

SUMMARY OF THE INVENTION

The present invention provides a process of preparing a "living" polymer comprising contacting under polymerization conditions at least one polar acrylic-type alpha olefinic monomer with (i) a tetracoordinate organosilicon, organotin, or organogermanium polymerization initiator having at least one activating substituent or activating diradical attached thereto and optionally having one or more substituents that are inert under polymerizing conditions, (ii) a catalyst which is a salt comprising an oxyanion or bioxyanion whose conjugate acid has a pKa (DMSO) of about 5 to about 24, and a suitable cation, characterized by also contacting with (iii) a polymerization livingness enhancement agent which is selected from the group consisting of o-silylated ester or ether modification of an oxyanion compound whose conjugate acid has a pKa (DMSO) of about 5 to 24, which is not a polymerization initiator, having no activating substituent or activating diradical attached thereto, containing at least one equivalent of $R_3Si$-group per mole of said compound, wherein R is hydrocarbyl of up to 20 carbon atoms, optionally containing one or more ether oxygen atoms within aliphatic segments thereof, and optionally containing one or more functional substituents that are unreactive under polymerizing conditions.

Preferably, the catalyst is tetra (n-butyl) ammonium 3-chlorobenzoate (TBA-CB) or tetra (n-butyl ammonium bi-3-bichlorobenzoate (TBA-biCB) and the enhancement agent is a trimethyl silyl ester of 3-chlorobenzoate.

The preferred concentration of the enhancement agent is in the range of at least about 0.1, or about 0.1 to 1000 moles per mole of catalyst, more preferably 0.1 to 200, sometimes optionally 5 to 25 or 0.2 to 2.5.

The preferred conjugate acid of the oxyanion catalyst has a pKa (DMSO) of about 6–21, more preferably 8–18.

Preferably the pKa of the livingness enhancement agent is equal to or lower than the pKa of the catalyst.

DETAILED DISCLOSURE

In the process of the invention, the polymer produced is "living" in that the polymerization is characterized by the presence, in the growing and in the grown polymer, of a moiety containing the aforesaid metal at "living" ends and the activating substituent or diradical, or a tautomer thereof, at "nonliving" ends of the polymer.

Monomers which are useful herein are of the formula $CH_2=C(Y)X$ wherein:

X is $-CN$, $-CH=CHC(O)X'$ or $-C(O)X'$;

Y is $-H$, $-CH_3$, $-CN$ or $-CO_2R$, provided, however, when X is $-CH=CHC(O)X'$, Y is $-H$ or $-CH_3$;

X' is $-OSi(R^1)_3$, $-R$, $-OR$ or $-NR'R''$;

each $R^1$, independently, is H or a hydrocarbyl radical which is an aliphatic, alicyclic, aromatic or mixed aliphatic-aromatic radical containing up to 20 carbon atoms, provided that at least one $R^1$ group is not H;

R is a hydrocarbyl radical which is an aliphatic, alicyclic, aromatic or mixed aliphatic-aromatic radical containing up to 20 carbon atoms, or a polymeric radical containing at least 20 carbon atoms, any of said radicals optionally containing one or more ether oxygen atoms within aliphatic segments thereof, optionally containing one or more functional substituents that are unreactive under polymerizing conditions, and optionally containing one or more reactive substituents of the formula $-Z'(O)C-C(Y^1)=CH_2$ wherein $Y^1$ is H or $CH_3$ and Z' is O or NR'; and each of R' and R'' is independently selected from $C_{1-4}$ alkyl.

The initiator used in the polymerization of this invention is a silicon-containing initiator of U.S. Pat. Nos. 4,414,372, 4,524,196, 4,417,034 and 4,508,880 supra, and copending application Ser. Nos. 660,588, 660,589, 673,926 and 676,099. Initiators which are preferred for use herein are of the formula selected from $(R^1)_3MZ$, $(R^1)_2M(Z^1)_2$ and $O[M(R^1)_2X^1]_2$
wherein:
$R^1$ is as defined above;
Z is an activating substituent selected from the group consisting of

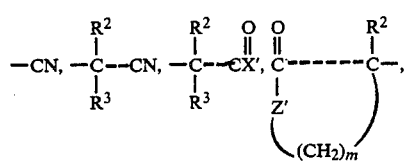

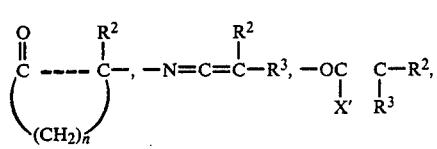

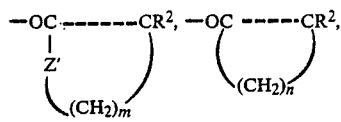

—SR, —OP(NR'R'')$_2$, —OP(OR$^1$)$_2$, —OP-[OSi(R$^1$)$_3$]$_2$ and mixtures thereof wherein R, R$^1$, R', R'', X' and Z' are as defined above:
$Z^1$ is the activating substituent

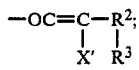

m is 2, 3 or 4;
n is 3, 4 or 5;
M is Si, Sn or Ge, provided, however, when Z is

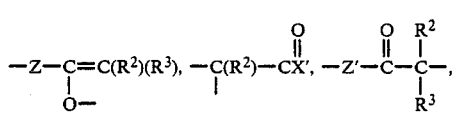

M is Sn or Ge; and
each of $R^2$ and $R^3$ is independently selected from H and hydrocarbyl, defined as for R above;
(a) at least one of any R, $R^2$ and $R^3$ in the initiator optionally containing one or more initiating substituents of the formula —Z$^2$—M(R$^1$)$_3$
wherein
M and $R^1$ are as defined above;
$Z^2$ is an activating diradical selected from the group consisting of

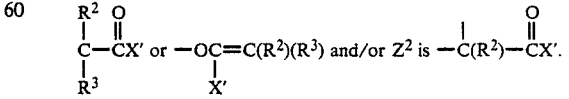

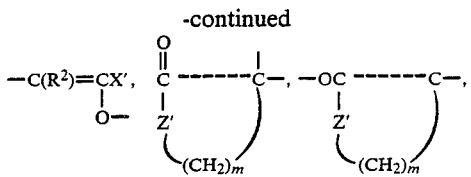

and mixtures thereof, wherein $R^2$, $R^3$, X', Z', m and n are as defined above provided however when $Z^2$ is

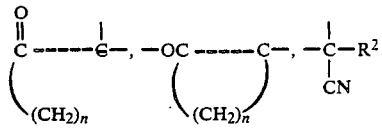

M is Sn or Ge,
(b) $R^2$ and $R^3$ taken together are

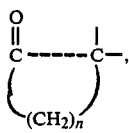

if Z is

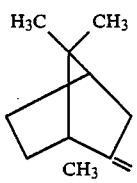

or —OC=C(R$^2$)(R$^3$) and/or $Z^2$ is

and
(c) X' and either $R^2$ or $R^3$ taken together are

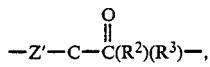

if Z is

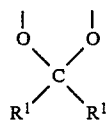

By conjugate acid is meant the acid formed by protonating the catalytic oxyanion; for example, the conjugate acid of acetate anion is acetic acid, and the biacetate anion is acetic acid dimer.

By pKa (DMSO) of the conjugate acid is meant the negative logarithm of the acidity constant of the conjugate acid, measured in dimethylsulfoxide (DMSO) at 25° C. Methods for measuring pKa values of various acidic compounds, including oxyacids, are abundantly described in the literature, for example, by F. G. Bordwell et al., J. Org. Chem., 45, 3305 (1980); 46, 4327 (1981); 47, 3224 (1982); and 49, 1424 (1984).

EXPLANATION OF LIVINGNESS ENHANCEMENT WITH SILYLATED OXYANIONS

Group transfer polymerization (GTP) is a "living" polymerization in that monomer units successively add to the end of a growing polymer chain and there is no chain transfer and ideally no termination. Such a process gives us the ability to make monodisperse polymers ($\overline{M}_w/\overline{M}_n$ approaches 1.0) and block copolymers of wall controlled architecture, but only if self-termination reactions can be controlled. Such a self-termination reaction results in premature termination of polymer chains, which causes various effects in the resultant polymers.

For example, the molecular weight distribution of linear polymers will broaden (dispersity will be greater than 1). Linear polymers made with multiple monomer feeds may exhibit multi-modal molecular weight distributions, where the molecular weight of each peak seen in the distribution corresponds to the amount of living polymer which remains at the start of each successive monomer feed. In star block copolymers (monofunctional monomer blocked with small amounts of difunctional monomer to provide crosslinking of the living chains of monofunctional polymer) there will be an amount of low molecular weight polymer which corresponds to the amount of polymer chains which terminated before addition of difunctional monomer at the star forming step. Similarly, in linear block copolymers some homopolymer of the first monomer will be present at the end of the polymerization.

Acetonitrile and silylated acetonitrile have been shown to enhance the livingness of some GTP polymerizations when used in controlled quantities. The silyl ethers or esters of oxyanion GTP catalysts are also capable of controlling the livingness of GTP polymerizations and are much more effective in this function than either acetonitrile or silyl acetonitrile, especially at higher polymerization temperatures.

For some purposes, it is desirable but not necessary to match the silylated oxyanion material with the appropriate oxyanion catalyst. For example, trimethylsilyl 3-chlorobenzoate is preferably used with tetra(n-butyl) ammonium 3-chlorobenzoate catalyst.

An example of a silylated modification of an oxyanion compound which is an initiator and therefore excluded from section (iii) of the claims are silylated (2-trimethylsilyl) acetate esters.

In the following preparations and comparisons, the weight average and number average molecular weights of the polymer products ($\overline{M}_w$ and $\overline{M}_n$ respectively) were measured by gel permeation chromatography (GPC). The polydispersity of the polymer is defined by $\overline{D}=\overline{M}_w/\overline{M}_n$. The peak molecular weight (Mp) determined by GPC is also reported in various instances. The degree of polymerization (Dp) is also reported for various monomers used. Unless otherwise specified, any "living" polymer products which were obtained were quenched by exposure to moist air or methanol before molecular weights were determined. All temperatures are in degrees Celsius. All parts, proportions and percentages are by weight except where indicated otherwise.

Preparation 1

Preparation of Trimethylsilyl-3-chlorobenzoate

A 250 ml round bottom 3-neck flask equipped with a condensor, thermocouple, N$_2$ inlet and polytetrafluoroethylene (PTFE) coated magnetic stir-bar was charged with 38.05 grams of 3-chlorobenzoic acid and 56.53 grams of hexamethyldisilazane. This mixture was heated to reflux and refluxed for 8 hours, until ammonia evolution ceased. Excess hexamethyldisilazane was stripped from the reaction mixture through a sidearm condensor at 50 mmHg until the temperature of the flask contents reached 125° C.

Comparison 1

Preparation of MMA//EGDM (Dp-100//Dp-4) Star Polymer (Dp=degree of polymerization)

Monomers and solvents used were prepared as follows. Tetrahydrofuran (THF) was prepared (purified) by distillation from sodium/benzophenone just prior to use. Methyl methacrylate (MMA) and ethylene glycol dimethacrylate (EGDM) were prepared by passage through columns of neutral anhydrous alumina, and the MMA was subsequently distilled at 100 mmHg from calcium hydride and stored at 0° C. for less than 1 week, 1-trimethylsiloxy-1-methoxy-2-methyl propene was prepared by 2 spinning-band distillations (50 mmHg).

A 250 ml round bottom 3-neck flask equipped with a condensor, thermocouple, N$_2$ and vacuum inlets and a mechanical stirrer was dried under vacuum (5 mmHg) with a heat gun and allowed to cool under N$_2$ purge. This apparatus was placed in a 50° C. water bath and charged with 117.5 grams of THF, which was allowed to equilibrate to 50° C. After equilibration, the flask was further charged with 1.015 grams of 1-trimethylsiloxy-1-methoxy-2-methyl propene and 0.325 ml of a 0.353 molar solution in THF of tetra(n-butyl) ammonium 3-chlorobenzoate. A 30 minute feed of 60.08 grams of MMA was started 2 minutes after charging the tetra(n-butyl) ammonium 3-chlorobenzoate to the reaction flask. The reaction temperature was maintained at 50° C.±0.5° C. throughout the feed. The contents of the flask were maintained at 50° C.±0.5° C. for 30 minutes following the completion of the MMA feed. At this time, 4.45 grams of EGDM was feed into the reaction flask over 10 minutes. The contents of the reaction flask were maintained at 50° C.±0.7° C. during the EGDM feed. Methanol (5 ml) and toluene (0.432 grams) were charged to the flask 1 hour after the end of the EGDM feed.

No detectable by high pressure liquid chromatography (HPLC) EGDM or MMA remained after addition of the methanol and toluene. The resulting molecular weight distribution by gel permeation chromatography (GPC) was bimodal, with a low molecular weight fraction (11,000 Mp) comprising 40% of the polymer by weight and a high molecular weight fraction (180,000 Mp) comprising the remaining 60%.

EXAMPLE 1

Preparation of MMA//EGDM (Dp-100//Dp-4) Star Polymer with TMS-CB

Monomers and solvents used were prepared as follows. THF was prepared by distillation from sodium/benzophenone just prior to use. MMA and EGDM were prepared by passage through columns of neutral anhydrous alumina and the MMA was subsequently distilled (100 mmHg) from calcium hydride and stored at 0° C. for less than 1 week. 1-trimethylsiloxy-1-methoxy-2-methyl propene was prepared by 2 spinning-band distillations (50 mmHg).

A 250 ml round bottom 3-neck flask equipped with a condenser, thermocouple, $N_2$ and vacuum inlets and a mechanical stirrer was dried under vacuum (5 mmHg) with a heat gun and allowed to cool under $N_2$ purge. This apparatus was placed in a 50° C. water bath and charged with 116.01 grams of THF, which was allowed to equilibrate to 50° C. before the subsequent addition of 0.325 ml of a 0.353 molar solution of tetra(n-butyl)ammonium 3-chlorobenzoate in THF, 1.023 grams of 1-trimethylsiloxy-1-methoxy-2-methyl propene and 1.140 ml of a 0.0961 molar solution in THF of trimethylsilyl-3-chlorobenzoate (TMS-CB). A 30 minute feed of 58.46 grams of MMA was started 2 minutes after the addition of TMS-CB. The reaction contents were maintained at 50° C.±0.7° C. throughout the feed and for 30 minutes following the end of the MMA feed. A 10 minute feed of 4.61 grams of EGDM was started 30 minutes after the end of the MMA feed. The reaction contents were maintained at 50° C.±0.5° C. during this feed. Methanol (5 ml) and toluene (0.444 grams) were added to the flask 1 hour after the end of the EGDM feed.

Conversions of EGDM and MMA were determined (by HPLC) to be 99.7% and 99.0%, respectively. The resulting molecular weight distribution (by GPC) was bimodal, with a low molecular weight fraction (7.890 Mp) comprising 26% of the polymer by weight and a high molecular weight fraction (134,000 Mp) comprising the remaining 74%. This compares with 60% high molecular weight fraction in Comparison 1.

EXAMPLE 2

Preparation of GMA//MMA (Dp-4//Dp-100) copolymer with TMS-CB

Monomers and solvents used were prepared as follows. THF was prepared by distillation from sodium/benzophenone just prior to use. MMA was prepared by passage through a column of neutral anhydrous alumina and was subsequently distilled (100 mmHg) from calcium hydride and stored at 0° C. for less than 1 week. GMA was distilled (4 mmHg) and inhibited with 100 ppm t-butyl-hydroxymethyl-phenyl sulfide. 1-trimethylsiloxy-1-methoxy-2-methyl propene was prepared by 2 spinning-band distillations (50 mmHg).

A 250 ml round bottom 3-neck flask equipped with a condenser, thermocouple, $N_2$ and vacuum inlets and a mechanical stirrer was dried under vacuum (5 mmHg) with a heat gun and allowed to cool under $N_2$ purge. This apparatus was placed in a 50° C. water bath and charged with 67.65 grams of THF. The solvent was allowed to equilibrate to 50° C. before addition of 0.539 grams of 1-trimethyl-siloxy-1-methoxy-2-methyl propene, 0.032 grams of trimethylsilyl-3-chlorobenzoate, and 0.128 ml of a 0.466 molar solution in THF of tetra(n-butyl)ammonium 3-chlorobenzoate. After agitating 2 minutes, 1.74 grams of GMA were added to the flask all at once. A 1.3° C. exotherm was noted. A 30 minute feed of 30.25 grams of MMA was started 15 minutes after the GMA was added. The flask contents were maintained at 50.4° C.±0.4° C. throughout the MMA feed and for 10 minutes thereafter. Methanol (5 ml) and toluene (0.442 grams) were added to the flask 1 hour after the end of the MMA feed.

Conversions of GMA and MMA were determined (by HPLC) to be 100% and 84.0%, respectively. The resulting molecular weight distribution (by GPC) exhibited a low molecular weight tail ($\overline{D}=1.982$), with the low molecular weight fraction (1,500 Mp) comprising 2% of the polymer by weight and a high molecular weight fraction (22,000 Mp) comprising the remaining 98%. After functionalization of the epoxy groups with benzoic acid (Preparation 2), a bimodal molecular weight distribution ($\overline{D}=3.422$) was detected by UV detection on a GPC. The low molecular weight fraction (2,800 Mp) contained 43.5% of the benzoic acid while the high molecular weight fraction (19,000 Mp) contained the remaining 56.5%. The same sample exhibited a molecular weight distribution (by RI detection on a GPC) similar to that of the original sample. Therefore, only 43.5% of the GMA homopolymer had terminated before the MMA addition, compared with 100% of the GMA in Comparison 2.

PREPARATION 2

Reaction of GMA//MMA (Dp-6//Dp-100) copolymer with Benzoic Acid

The GMA//MMA copolymers (prepared by Example 2) were functionalized with benzoic acid as follows.

A 500 ml 3-neck flask equipped with a thermometer, fractionating condenser and PTFE-coated magnetic stir-bar was charged with 67.4 grams of GMA//MMA copolymer solution (prepared in Examples 4 and 5), 9 grams of benzoic acid, 100 ml toluene and 100 ml propylene carbonate. This solution was heated with a heating mantle to reflux. Approximately 110 ml of solvent was stripped off until the reflux temperature reached 140° C. The remaining contents were refluxed for 3 hours at 140° C.

At this point, 98.8% of the original epoxy content had disappeared (by epoxy titration).

COMPARISON 2

Preparation of GMA//MMA (Dp-4//Dp-100) copolymer

Monomers and solvents used were prepared as follows. THF was prepared by distillation from sodium/benzophenone just prior to use. MMA was prepared by passage through a column of neutral anhydrous alumina and was subsequently distilled (100 mmHg) from calcium hydride and stored at 0° C. for less than 1 week. Glycidyl methacrylate (GMA) was distilled (4 mmHg) and inhibited with 100 ppm t-butyl-hydroxymethyl-phenyl sulfide. 1-trimethylsiloxy-1-methoxy-2-methyl propene was prepared by 2 spinning-band distillations (50 mmHg).

A 250 ml round bottom 3-neck flask equipped with a condenser, thermocouple, $N_2$ and vacuum inlets and a mechanical stirrer was dired under vacuum (5 mmHg) with a heat gun and allowed to cool under $N_2$ purge. This apparatus was placed in a 50° C. water bath and charged with 68.20 grams of THF. The solvent was allowed to equilibrate to 50° C. before addition of 0.543 grams of 1-trimethylsiloxy-1-methoxy-2-methyl propene and 0.128 ml of a 0.466 molar solution of tetra(n-butyl)ammonium 3-chlorobenzoate. After agitating 2 minutes, 1.63 grams of GMA were added to the flask all at once. A 1.8° C. exotherm was noted. A 30 minute feed of 30.05 grams of MMA was started 15 minutes after the GMA was added. The flask contents were maintained at 50.3° C.±0.3° C. throughout the MMA feed and for 10 minutes thereafter. Methanol (5 ml) and toluene (0.443 grams) were added to the flask 1 hour after the end of the MMA feed.

Conversions of GMA and MMA were determined (by HPLC) to be 100% and 87.0%, respectively. The resulting molecular weight distribution (by GPC) was bimodal ($\overline{D}$=4.675), with a low molecular weight fraction (1,700 Mp) comprising 6% of the polymer by weight and a high molecular weight fraction (95,000 Mp) comprising the remaining 94%.

In order to distinguish epoxy containing polymer (GMA-containing) from block copolymer and homo-MMA polymer, the residual epoxy groups in the polymers were reacted with benzoic acid (Preparation 2). Ultraviolet (UV) techniques will only detect the benzoate esters located on the GMA-containing polymers, while refractive index (RI) techniques will detect all polymer species present. The use of both UV and RI techniques simultaneously on a GPC output stream enables determination of the amount of homo-GMA and block copolymers which exist in the polymer mixture.

After functionalization of the epoxy groups with benzoic acid a unimodal molecular weight distribution ($\overline{D}$=1.421) was detected by UV detection on a GPC. The molecular weight of this material was 2.700 Mp. The same sample exhibited a bimodal molecular weight distribution detected by RI on a GPC, similar to that of the original sample. Therefore, all the GMA homopolymer terminated before the MMA addition.

COMPARISON 3

Preparation of MMA (Dp-200) Linear Homopolymer by Multiple Monomer Feeds

MMA was prepared by chromatographing through neutral anhydrous alumina and was stored at 0° C. uninhibited for less than 2 weeks. THF was prepared by distillation from sodium/benzophenone just prior to use. 1-trimethylsiloxyl-1-methoxy-2-methyl propene was prepared by two spinning-band distillations (50 mmHg).

A 250 ml round bottom 3-neck flask equipped with a condenser, thermocouple, N$_2$ and vacuum inlets, an addition funnel, a heating mantle and a mechanical stirrer was dried under vacuum (5 mmHg) with a heat gun and allowed to cool under N$_2$ purge. This apparatus was charged with 104.01 grams of THF and heated to reflux (67.9° C.). Once at reflux, 0.8 ml of a 0.1036 molar solution (in THF) of trimethylsilyl acetonitrile and 0.172 ml of a 0.466 molar solution of tetra(n-butyl) ammonium 3-chlorobenzoate (TBA-CB) (in THF) were charged to the flask. The flask was further charged with 0.6750 grams of 1-trimethylsiloxyl-1-methoxy-2-methyl propene initiator. A 20 minute feed of 19.85 grams of MMA was started immediately after the initiator was charged. The reflux temperature increased from 68.0° to 68.3° C. over the course of the monomer feed. The reaction mixture was held at reflux (68.0° C.) for 60 minutes before a sample (A) was taken for molecular weight determination and a second MMA feed (20.20 grams over 20 minutes) was started. The reflux temperature rose from 67.8 to 69.8° C. over the course of the monomer feed. The reaction mixture was again held at reflux (70.0° C.) for 60 minutes before a sample (B) was taken for molecular weight determination and a third MMA feed (20.15 grams over 20 minutes) was started. The reflux temperature increased from 69.6° to 71.9° C. over the course of this monomer feed. Again the reaction mixture was held for 60 minutes at reflux (71.5° C.) before taking a sample (C) for molecular weight determination and starting a fourth MMA feed (20.25 grams over 20 minutes). The reflux temperature increased from 71.6° to 73.9° C. over this monomer feed. The reaction mixture was held for 10 minutes at reflux after the end of the fourth monomer feed before the heating mantle was removed and the mixture allowed to cool to room temperature for 60 minutes before 5 mls of methanol and 0.444 grams of toluene were added and a sample (D) taken for molecular weight determination.

The molecular weight distributions of each sample were determined by GPC and are summarized in Table 1 along with results for Comparison 3A which used twice as much silylated acetonitrile (TMS-CH$_3$CN).

EXAMPLE 3

Preparation of MMA (Dp-200) Linear Homopolymer by Multiple Monomer Feeds with trimethylsilyl-3-chlorobenzoate (TMS-CB)

MMA was prepared by chromatographing through neutral anhydrous alumina and was stored at 0° C. uninhibited for less than 2 weeks. THF was prepared by distillation from sodium/benzophenone just prior to use. 1-trimethylsiloxy-1-methoxy-2-methyl propene was prepared by two spinning-band distillations (50 mmHg).

A 250 ml round bottom 3-neck flask equipped with a condenser, thermocouple, N$_2$ and vacuum inlets, an addition funnel, a heating mantle and a mechanical stirrer was dried under vacuum (5 mmHg) with a heat gun and allowed to cool under N$_2$ purge. This apparatus was charged with 105.3 grams of THF and heated to reflux (67.9° C.). Once at reflux, 0.8 ml of a 0.1036 molar solution (in THF) of trimethylsilyl acetonitrile, 0.8 ml of a 0.1104 molar solution (in THF) of TMS-CB and 0.172 ml of a 0.466 molar solution of TBA-CB (in THF) were charged to the flask. The flask was further charged with 0.692 grams of 1-trimethylsiloxy-1-methoxy-2-methyl propene initiator. A 20 minute feed of 20.08 grams of MMA was started immediately after the initiator was charge. The reflux temperature increased from 67.9° to 69° C. over the course of the monomer fee. The reaction mixture was held at reflux (68.5° C.) for 60 minutes before a sample (A) was taken for molecular weight determination and a second MMA feed (20.08 grams over 20 minutes) was started. The reflux temperature rose from 67.7° to 69.5° C. over the course of the monomer feed. The reaction mixture was again held at reflux (68.7° C.) for 60 minutes before a sample (B) was taken for molecular weight determination and a third MMA feed (20.20 grams over 20 minutes) was started. The reflux temperature increased from 67.9 to 70.5 over the course of this monomer feed. Again the reaction mixture was held for 60 minutes at reflux (69.2° C.) before taking a sample (C) for molecular weight determination and starting a fourth MMA feed (19.75 grams over 20 minutes). The reflux temperature increased from 67.9° to 70.4° C. over this monomer feed. The reaction mixture was held for 10 minutes at reflux after the end of the fourth monomer feed before the heating mantle was removed and the mixture allowed to cool to room temperature for 60 minutes before 5 ml of methanol and 0.442 grams of toluene were added and a sample (D) taken from molecular weight determination.

The molecular weight distributions of each sample were determined by GPC and are summarized in Table 1 along with results for Example 3A which omitted the silylated acetonitrile. Those results show that the polymerization was living over all four monomer feeds, and that significantly less polymer chains had died atboth the first and second monomer feeds than in Comparison 3 since the molecular weights were closer to theory.

the reaction was quenched with methanol (5 ml). Toluene (0.442 g) was added to the flask at this time.

Conversions of the MMA and EGDM and molecular weight distributions are summarized in Table 2.

EXAMPLE 4

Preparation of MMA//EGDM (Dp-100//Dp-4) Star Polymer with TMS-AC and TBAAC at reflux Monomers and Solvents used were prepared as follows. THF was prepared (purified) by distillation from sodium/benzophenone just prior to use. MMA and EGDM were prepared by passage through columns of neutral anhydrous alumina, and the MMA was subsequently distilled at 100 mmHg from calcium hydride

TABLE 1

Molecular Weight Results of Multiple Monomer Feed Livingness Tests for TMS-CB Patent Examples and Comparisons In Refluxing THF Solvent

| Test | % TMS-CH$_3$CN | % TMS-CB | MN theory | $\bar{M}_n$ actual | Dispersity $\bar{M}_w/\bar{M}_n$ | Mp of Peak 1 | Mp of Peak 2 | Mp of Peak 3 | Mp of Peak 4 | Weight % of Resultant Polymer in Peak 1 | Peak 2 | Peak 3 | Peak 4 |
|---|---|---|---|---|---|---|---|---|---|---|---|---|---|
| Comp. 3 | 2.14 | 0.00 | 5,117 | 9,458 | 1.29 | 14,000 | — | — | — | 100 | — | — | — |
| | | | 10,324 | 15,500 | 3.43 | 14,000 | 100,000 | — | — | 51 | 49 | — | — |
| | | | 15,518 | 15,200 | 3.50 | 13,000 | 95,500 | — | — | 51 | 49 | — | — |
| | | | 20,738 | 16,600 | 3.28 | 13,000 | 100,000 | — | — | 51 | 49 | — | — |
| Comp. 3A | 4.26 | 0.00 | 5,093 | n/a | n/a | n/a | n/a | n/a | n/a | n/a | n/a | n/a | n/a |
| | | | 10,196 | 14,300 | 2.91 | 12,022 | 64,565 | — | — | 46 | 54 | — | — |
| | | | 15,507 | 15,400 | 3.11 | 12,022 | 67,600 | — | — | 44 | 56 | — | — |
| | | | 20,729 | 16,900 | 2.82 | 12,022 | 67,600 | — | — | 44 | 56 | — | — |
| Ex. 3 | 2.08 | 2.22 | 5,165 | 7,040 | 1.21 | 9,600 | — | — | — | 100 | — | — | — |
| | | | 10,214 | 12,500 | 1.53 | 9,600 | 27,000 | — | — | 33 | 67 | — | — |
| | | | 15,293 | 20,300 | 1.96 | 9,600 | 27,000 | 59,000 | — | 20 | 30 | 50 | — |
| | | | 20,529 | 21,900 | 2.48 | 9,600 | 27,000 | 59,000 | 70,000 | 18 | 25 | 33 | 24 |
| Ex. 3A | 0.00 | 2.21 | 5,093 | 7,200 | 1.22 | 9,600 | — | — | — | 100 | — | — | — |
| | | | 10,250 | 13,200 | 1.99 | 9,600 | 40,000 | — | — | 40 | 60 | — | — |
| | | | 15,223 | 19,900 | 3.00 | 9,600 | 44,000 | 126,000 | — | 27 | 49 | 24 | — |
| | | | 20,104 | 17,200 | 3.57 | 9,600 | 41,000 | 126,000 | — | 27 | 51 | 22 | — |

COMPARISON 4

Preparation of MMA//EGDM (Dp-100//Dp-4) Star Polymer with TBAAC at reflux

Monomers and Solvents used were prepared as follows. THF was prepared (purified) by distillation from sodium/benzophenone just prior to use. MMA and EGDM were prepared by passage through columns of neutral anhydrous alumina, and the MMA was subsequently distilled at 100 mmHg from calcium hydride and stored at 0° C. for less than 1 week. 1-trimethylsiloxy-1-methoxy- 2-methyl propene was prepared by 2 spinning-band distillations (50 mmHg).

A 250 ml round bottom 3-neck flask equipped with a condensor, thermocouple, N$_2$ and vacuum inlets and a mechanical stirrer was dried under vacuum (5 mmHg) with a heat gun and allowed to cool under N$_2$ purge. This apparatus was equipped with a heating mantle and charged with 60.6 g of THF, which was heated to reflux (67° C.). At reflux, the flask was further charged with 0.550 g of 1-trimethylsiloxy-1-methoxy-2-methyl propene, 0.575 ml of a 0.1 molar solution (in THF) of tetra(n-butyl)ammonium acetate (TBAAC). A 30 minute feed of 30.40 g of MMA was started 2 minutes after addition of the TBAAC. The reaction was maintained at reflux throughout the feed and for an additional 30 minutes beyond the end of the MMA feed. At this time, 2.70 g of EGDM was fed into the reaction flask over 10 minutes. The contents of the reaction flask were maintained at reflux during the EGDM feed and for 5 additional minutes. The flask was allowed to cool to room temperature over the next 55 minutes, at which point and stored at 0° C. for less than 1 week. 1-trimethylsiloxy-1-methoxy-2-methyl propene was prepared by 2 spinning-band distillations (50 mmHg).

A 250 ml round bottom 3-neck flask equipped with a condensor, thermocouple, N$_2$ and vacuum inlets and a mechanical stirrer was dried under vacuum (5 mmHg) with a heat gun and allowed to cool under N$_2$ purge. This apparatus was equipped with a heating mantle and charged with 58.32 g of THF, which was heated to reflux (67° C.). At reflux, the flask was further charged with 0.570 g of 1-trimethylsiloxy-1-methoxy-2-methyl propene, 0.575 ml of a 0.1 molar solution (in THF) of tetra(n-butyl)ammonium acetate (TBAAC) and 0.183 ml of a 0.88 molar solution (in THF) of trimethylsilyl acetate (TMSAC). A 30 minute feed of 30.92 g of MMA was started 2 minutes after addition of the TMSAC. The reaction was maintained at reflux throughout the feed and for an additional 30 minutes beyond the end of the MMA feed. At this time, 2.60 g of EGDM was fed into the reaction flask over 10 minutes. The contents of the reaction flask were maintained at reflux during the EGDM feed and for 5 additional minutes. The flask was allowed to cool to room temperature over the next 55 minutes, at which point the reaction was quenched with methanol (5 ml). Toluene (0.442 g) was added to the flask at this time.

Conversions of the MMA and EGDM, and molecular weight distributions are summarized in Table 2 along with the results for Examples 4a and 4b which used different levels of TMSAC. These results show that the polymerization was more living at the start of the EGDM feed when TMSAC was added to the reaction since there is better molecular weight control, higher monomer conversion and lower unattached arms (less low molecular material) than in Comparison 4 where no TMSAC was used. These examples and the comparison show that improvements in molecular weight control, conversion and unattached arms are dependand on the amount of TMSAC used. All examples (4, 4a and 4b) showed low conversions, and eventually gelled on standing.

COMPARISON 5

Preparation of MMA//EGDM (Dp-100//Dp-4) Star Polymer with TBACB at reflux

Monomers and Solvents used were prepared as follows. THF was prepared (purified) by distillation from sodium/benzophenone just prior to use. MMA and EGDM were prepared by passage through columns of neutral anhydrous alumina, and the MMA was subsequently distilled at 100 mmHg from calcium hydride and stored at 0° C. for less than 1 week. 1-trimethylsiloxy-1-methoxy- 2-methyl propene was prepared by 2 spinning-band distillations (50 mmHg).

A 250 ml round bottom 3-neck flask equipped with a condenser, thermocouple, N₂ and vacuum inlets and a mechanical stirrer was dried under vacuum (5 mmHg) with a heat gun and allowed to cool under N₂ purge. This apparatus was equipped with a heating mantle and charged with 59.20 g of THF, which was heated to reflux (67° C.). At reflux, the flask was further charged with 0.70 g of 1-trimethylsiloxy-1-methoxy-2-methyl propene and 0.150 ml of a 0.38 molar solution (in THF) of tetra(n-butyl)ammonium 3-chlorobenzoate (TBACB). A 30 minute feed of 30.49 g of MMA was started 2 minutes after addition of the TBACB. The reaction was maintained at reflux throughout the feed and for an additional 30 minutes beyond the end of the MMA feed. At this time, 2.60 g of EGDM was feed into the reaction flask over 10 minutes. The contents of the reaction flask were maintained at reflux during the EGDM feed and for 5 additional minutes. The flask was allowed to cool to room temperature over the next 55 minutes, at which point the reaction was quenched with methanol (5 ml). Toluene (0.446 g) was added to the flask at this time.

Conversions of the MMA and EGDM and molecular weight distributions are summarized in Table 2.

EXAMPLE 5

Preparation of MMA//EGDM (Dp-100//Dp-4) Star Polymer with TBACB and TMSAC at reflux Monomers and Solvents used were prepared as follows. THF was prepared (purified) by distillation from sodium/benzophenone just prior to use. MMA and EGDM were prepared by passage through columns of neutral anhydrous alumina, and the MMA was subsequently distilled at 100 mmHg from calcium hydride and stored at 0° C. for less than 1 week. 1-trimethylsiloxy-1-methoxy-2-methyl propene was prepared by 2 spinning-band distillations (50 mmHg).

A 250 ml round bottom 3-neck flask equipped with a condenser, thermocouple, N₂ and vacuum inlets and a mechanical stirrer was dried under vacuum (5 mmHg) with a heat gun and allowed to cool under N₂ purge. This apparatus was equipped with a heating mantle and charged with 58.20 g of THF, which was heated to reflux (67° C.). At reflux, the flask was further charged with 0.580 g of 1-trimethylsiloxy-1-methoxy-2-methyl propene, 0.150 ml of a 0.38 molar solution (in THF) of tetra(n-butyl)ammonium 3-chlorobenzoate (TBACB) and 0.325 ml of a 0.88 molar solution (in THF) of trimethylsilyl acetate (TMSAC). A 30 minute feed of 30.26 g of MMA was started 2 minutes after addition of the TBACB. The reaction was maintained at reflux throughout the feed and for an additional 30 minutes beyond the end of the MMA feed. At this time, 2.55 g of EGDM was feed into the reaction flask over 10 minutes. The contents of the reaction flask were maintained at reflux during the EGDM feed and for 5 additional minutes. The flask was allowed to cool to room temperature over the next 55 minutes, at which point the reaction was quenched with methanol (5 ml). Toluene (0.445 g) was added to the flask at this time.

Conversions of the MMA and EGDM and molecular weight distributions are summarized in Table 2. By comparison of these results to Comparison 5 it is shown that, in these circumstances, the addition of a silylated oxyanion catalyst, which is made from a stronger GTP oxyanion catalyst (higher pKa in DMSO) than that used for the polymerization, does not improve the livingness of the GTP polymerization. The results show that the polymerization was less living at the start of the EGDM feed since the molecular weights and unattached arms were higher than in Comparison 5 where no TMSAC was used; although, monomer conversions are comparable.

EXAMPLE 6

Preparation of MMA//EGDM (Dp-100//Dp-4) Star Polymer with TMSCB and TBAAC at reflux Monomers and Solvents used were prepared as follows. THF was prepared (purified) by distillation from sodium/benzophenone just prior to use. MMA and EGDM were prepared by passage through columns of neutral anhydrous alumina, and the MMA was subsequently distilled at 100 mmHg from calcium hydride and stored at 0° C. for less than 1 week. 1-trimethylsiloxy-1-methoxy-2-methyl propene was prepared by 2 spinning-band distillations (50 mmHg).

A 250 ml round bottom 3-neck flask equipped with a condenser, thermocouple, N₂ and vacuum inlets and a mechanical stirrer was dried under vacuum (5 mmHg) with a heat gun and allowed to cool under N₂ purge. This apparatus was equipped with a heating mantle and charged with 59.42 g of THF, which was heated to reflux (67° C.). At reflux, the flask was further charged with 0.530 g of 1-trimethylsiloxy-1-methoxy-2-methyl propene, 0.575 ml of a 0.1 molar solution (in THF) of tetra(n butyl)ammonium acetate (TBAAC) and 1.3 ml of a 0.11 molar solution (in THF) of trimethylsilyl 3-chlorobenzoate (TMSCB). A 30 minute feed of 30.43 g of MMA was started 2 minutes after addition of the TBACB. The reaction was maintained at reflux throughout the feed and for an additional 30 minutes beyond the end of the MMA feed. At this time, 2.60 g of EGDM was fed into the reaction flask over 10 minutes. The contents of the reaction flask were maintained at reflux during the EGDM feed and for 5 additional minutes. The flask was allowed to cool to room temperature over the next 55 minutes, at which point the reaction was quenched with methanol (5 ml). Toluene (0.445 g) was added to the flask at this time.

Conversions of the MMA and EGDM and molecular weight distributions are summarized in Table 2. By comparison of these results to Comparison 4, it is shown that the addition of a silylated oxyanion which is a weaker GTP oxyanion catalyst (lower pKa in DMSO) than the oxyanion catalyst being used for the polymerization improves the livingness of the GTP polymerization since the molecular weights obtained are closer to theory and there are less unattached arms.

TABLE 2

Molecular Weight Results of GTP Star Polymers For Silylated Catalyst Examples and Comparisons In Refluxing THF Solvent

| Test | % TMSCB | % TMSAC | % TBACB | % TBAAC | $M_p$ of Peak 1 (unattached arms) | $M_p$ of Peak 2 (star) | Weight % Unattached Arms | Conversion MMA | Conversion EGDM |
|---|---|---|---|---|---|---|---|---|---|
| | (percent based on initiator) | | | | | | | | |
| Comp 4 | 0.00 | 0.00 | 0.00 | 1.82 | 100,000 | broad high MN tail | indeterminate | 17.56 | 0 |
| Ex 4 | 0.00 | 4.92 | 0.00 | 1.76 | 20,000 | 110,000 | 32 | 61.7 | 0 |
| Ex 4a | 0.00 | 2.29 | 0.00 | 1.87 | broad low MN tail | 180,000 | indeterminate | 0 | 0 |
| Ex 4b | 0.00 | 14.77 | 0.00 | 1.50 | 21,000 | 60,000 | 56 | 60.6 | 0 |
| Comp 5 | 0.00 | 0.00 | 1.42 | 0.00 | 13,000 | 61,000 | 50 | 88.1 | 6.5 |
| Ex 5 | 0.00 | 8.68 | 1.71 | 0.00 | 40,000 | 320,000 | 90 | 96.8 | 8 |
| Ex 6 | 4.70 | 0.00 | 0.00 | 1.89 | 11,000 | 105,000 | 21 | 98.55 | 98 |

We claim:

1. A process of preparing a "living" polymer comprising contacting under polymerization conditions at least one polar acrylic-type alpha olefinic monomer with (i) a tetracoordinate organosilicon, organotin, or organogermanium polymerization initiator having at least one activating substituent or activating diradical attached thereto and optionally having one or more substituents that are inert under polymerizing conditions, (ii) a catalyst which is a salt comprising an oxyanion or bioxyanion whose conjugate acid has a pKa(DMSO) of about 5 to about 24, and a suitable cation.

characterized by also contacting with (iii) a polymerization livingness enhancement agent which is selected from the group consisting of o-silylated ester or ether modification of an oxyanion compound whose conjugate acid has a pKa (DMSO) of about 5 to 24, which is not a polymerization initiator, having no activating substituent or activating diradical attached thereto, containing at least one equivalent of $R_3Si$-group per mole of said compound, wherein R is hydrocarbyl of up to 20 carbon atoms, optionally containing one or more ether oxygen atoms within aliphatic segments thereof, and optionally containing one or more functional substituents that are unreactive under polymerizing conditions.

2. The process of claim 1 wherein the polymerization initiator (i) is a tetracoordinate organosilicon species.

3. The process of claim 1 wherein the enhancement agent (iii) contains the same $R_3Si$-groups as the polymerization initiator (i).

4. The process of claim 2 wherein the enhancement agent (iii) consists of a silylated modification of the polymerization catalyst oxyanion (ii).

5. The process of claim 1 wherein the enhancement agent (iii) concentration percent is present at at least about 0.1 moles per mole of catalyst.

6. The process of claim 5 wherein the enhancement agent (iii) concentration is in the range of about 0.1 to 200 moles per mole of catalyst.

7. The process of claim 6 wherein the enhancement agent (iii) concentration is in the range of about 5 to 25 moles per mole of catalyst.

8. The process of claim 6 wherein the enhancement agent (iii) concentration is in the range of about 0.2 to 2.5 moles per mole of catalyst.

9. The process of claim 1 wherein the catalyst (ii) is a suitable source of 3-chlorobenzoate and the enhancement agent (iii) is the trimethyl silyl ester of 3-chlorobenzoate.

10. The process of claim 9 wherein the catalyst (ii) is tetra(n-butyl) ammonium 3-chlorobenzoate and the enhancement agent (iii) is the trimethyl silyl ester of 3-chlorobenzoate.

11. The process of claim 1 wherein the enhancement agent (iii) is a silylated modification of the oxyanion or bioxyanion of catalyst (ii).

12. The process of claim 10 wherein said conjugate acid has a pKa(DMSO) of about 6-21.

13. The process of claim 12 wherein said conjugate acid has a pKa(DMSO) of about 8-18.

14. The process of claim 1 carried on at temperatures above about 25° C.

15. The process of claim 14 carried out at temperatures between 30° and 100° C.

16. The process of claim 1 wherein the conjugate acid of the livingness enhancement agent (iii) has a pKa(DMSO) which is lower than the pKa(DMSO) of the conjugate acid of catalyst (ii).

* * * * *